Sept. 18, 1962 T. H. OSTER 3,054,903
ALTERNATOR
Filed March 14, 1961 2 Sheets-Sheet 1

THOMAS H. OSTER
INVENTOR.

BY John L. Faulkner
Keith L. Zerschling

ATTORNEYS

Sept. 18, 1962 T. H. OSTER 3,054,903
ALTERNATOR
Filed March 14, 1961 2 Sheets-Sheet 2

THOMAS H. OSTER
INVENTOR.

BY

ATTORNEYS

United States Patent Office 3,054,903
Patented Sept. 18, 1962

3,054,903
ALTERNATOR
Thomas H. Oster, Dearborn, Mich., assignor to Ford Motor Company, Dearborn, Mich., a corporation of Delaware
Filed Mar. 14, 1961, Ser. No. 95,615
20 Claims. (Cl. 290—1)

This invention lies in the field of internal combustion engines and is more specifically dedicated to the provision of such an internal combustion engine with an engine driven electrical alternator adapted to provide electrical energy to the engine accessories or to the vehicle driven by the internal combustion engine.

This alternator is characterized by the fact that it is located within and protected by the crankcase of the internal combustion engine. This alternator is of open frame construction so that the windings and bearings are subject to cooling, lubricating and insulating effects of the lubricant confined within the engine crankcase. The alternator is mechanically driven from the engine at a speed which should be higher than that of the engine and preferably at least three times as high as engine speed.

This invention is best explained in conjunction with the figures of drawing in which.

In the figures of drawings a typical automotive internal combustion engine is generally indicated at 10. The alternator employed to furnish electrical energy to the accessories attached to the internal combustion engine and to the vehicle in which it is carried is indicated at 11. Alternator 11 is driven by chain 12 from the crankshaft or other rotating part of internal combustion engine 10. It is clear that alternator 11 may also be driven by other conventional means such as gearing. It is preferable that alternator 11 rotate at a higher speed than the crankshaft of engine 10. A speed ratio of at least 3 to 1 is desirable. This ratio may be made as high as is mechanically practicable.

Figures 3, 4:
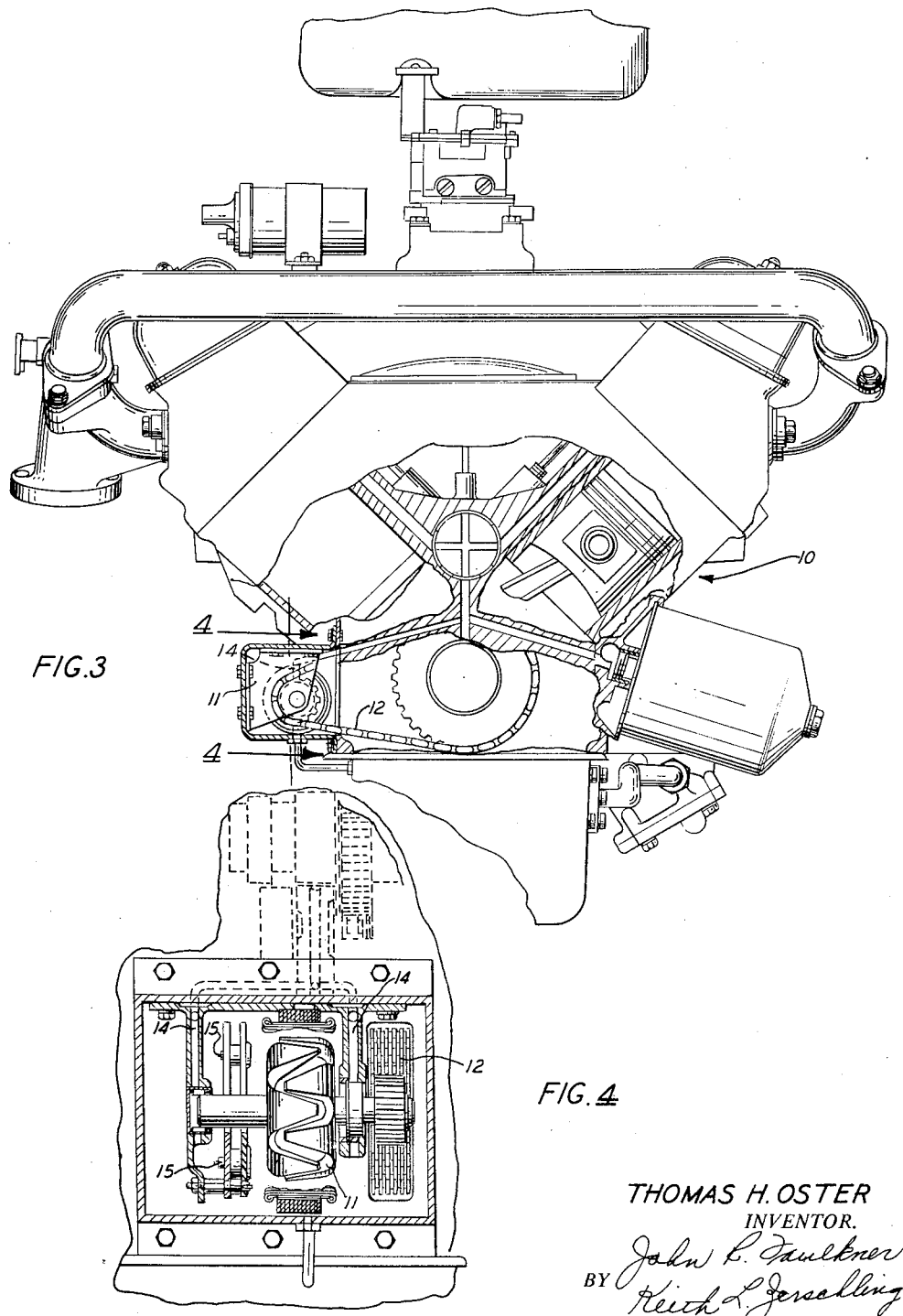
FIGURE 3 is a front elevation partially in section of another adaptation of the invention; and, FIGURE 4 is a section taken along the line 4—4 of FIGURE 3 and somewhat enlarged.

Alternator 11 is located within the crankcase and is cooled, lubricated and insulated by the lubricating oil confined within the crankcase. Accordingly it is preferred to construct the alternator in an open fashion so that the windings and bearings are readily accessible to the crankcase lubricant as it is distributed by the oil pump or by splash action. The bearings of the alternator may be additionally lubricated by lubricant supplied under pressure by the oil pump of the engine through conduits 14 as depicted in FIGURE 4.

Figure 1:
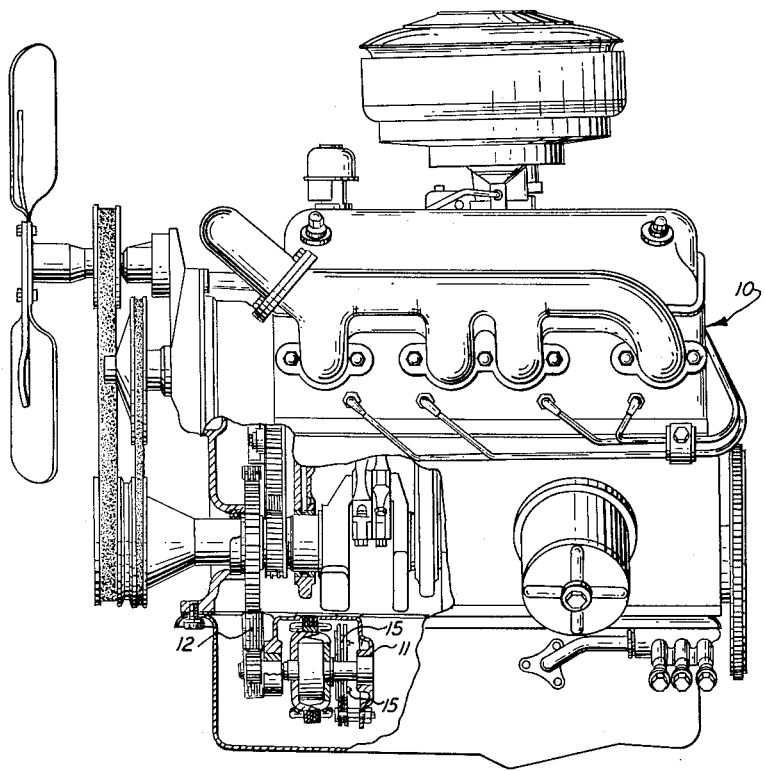
FIGURE 1 is a side elevation view of an engine partially in section in which such an alternator has been installed.
Figure 2:
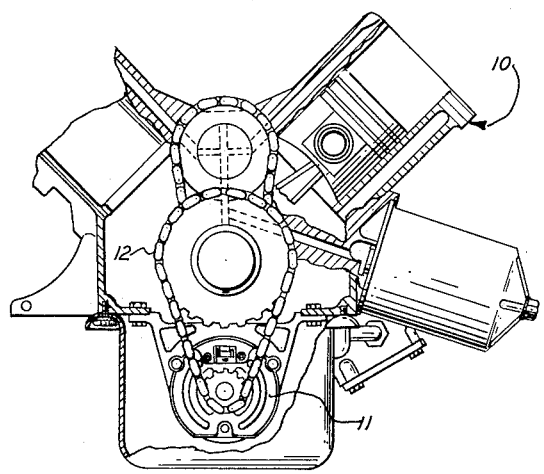
FIGURE 2 is a front elevation view partially in section of the structure shown in FIGURE 1.

The alternator may be located within the oil pan as shown in FIGURE 1 and hence liable to at least partial immersion in crankcase lubricant. Alternatively, the alternator may be located well above the level of the engine lubricant in an extension of the crankcase as shown in FIGURE 3. If it is desired to withdraw direct current from the crankcase mounted alternator, diodes 15 may be incorporated in the alternator 11 as shown in FIGURES 1 and 4.

The electrical structure of alternator 11 is not critical provided sliding contacts are kept to a minimum or eliminated altogether. It is preferred to construct alternator 11 structurally and electrically as an open frame polyphase induction motor or induction alternator. This type of electrical machine when used as a generator may be excited and regulated by the application of an appropriate quadrature current to the armature leads, as for example, by the connection thereto of capacitors. This type of machine also has the advantage of inherent stability at high speed due to the simplicity and ruggedness of the rotating member.

It is possible to employ a conventional rotating field, wound field alternator in which the field is excited via a self-contained diode. As stated supra, the precise type of alternator is not critical provided sliding contacts are minimized. The rectifiers necessary to the production of direct current from the alternator output are shown mounted on the alternator and so exposed to the cooling action of the crankcase lubricant. It is clear that such diodes may be mounted wherever desired without departing from the scope of the invention.

I claim:

1. An internal combustion engine and an open electrical generator for use in conjunction with the internal combustion engine, said open electrical generator being located within the crankcase of the internal combustion engine and being exposed to the cooling, insulating and lubricating action of the lubricant contained in the internal combustion engine crankcase.

2. A internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine.

3. An internal combustion engine and an open electrical generator for use in conjunction with the internal combustion engine, said open electrical generator being located within the crankcase of the internal combustion engine, being exposed to the cooling, insulating, and lubricating action of the lubricant contained in the internal combustion engine crankcase and being mechanically driven by the internal combustion engine at a speed substantially greater than the speed of the internal combustion engine.

4. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine at a speed at least three times the speed of the internal combustion engine.

5. An internal combustion engine and an open electrical generator for use in conjunction with the internal combustion engine, said open electrical generator being located within the crankcase of the internal combustion engine and being exposed to the cooling, insulating and lubricating action of the lubricant contained in the internal combustion engine crankcase, said open electrical generator comprising an induction alternator.

6. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine, said open electrical generator comprising an induction alternator.

7. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine at a speed substantially greater than the speed of the internal combustion engine, said open electrical generator comprising an induction alternator.

8. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine at a speed at least three times the speed of the internal combustion engine, said open electrical generator comprising an induction alternator.

9. An internal combustion engine and an open electrical generator for use in conjunction with the internal combustion engine, said open electrical generator being located within the crankcase of the internal combustion engine and being exposed to the cooling, insulating and lubricating action of the lubricant contained in the internal combustion engine crankcase, said open electrical generator producing direct current and comprising an induction alternator and a rectifier.

10. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine, said open electrical generator producing direct current and comprising an induction alternator and a rectifier.

11. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine at a speed substantially greater than the speed of the internal combustion engine, said open electrical generator producing direct current and comprising an induction alternator and a rectifier.

12. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine at a speed at least three times the speed of the internal combustion engine, said open electrical generator producing direct current and comprising an induction alternator and a rectifier.

13. An internal combustion engine and an open electrical generator for use in conjunction with the internal combustion engine, said open electrical generator being located within the crankcase of the internal combustion engine and being exposed to the cooling, insulating and lubricating action of the lubricant contained in the internal combustion engine crankcase, said open electrical generator comprising an alternator.

14. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine, said open electrical generator comprising an alternator.

15. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine at a speed substantially greater than the speed of the internal combustion engine, said open electrical generator comprising an alternator.

16. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine at a speed at least three times the speed of the internal combustion engine, said open electrical generator comprising an alternator.

17. An internal combustion engine and an open electrical generator for use in conjunction with the internal combustion engine, said open electrical generator being located within the crankcase of the internal combustion engine and being exposed to the cooling, insulating and lubricating action of the lubricant contained in the internal combustion engine crankcase, said open electrical generator producing direct current and comprising an alternator and a rectifier.

18. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine, said open electrical generator producing direct current and comprising an alternator and a rectifier.

19. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine at a speed substantially greater than the speed of the internal combustion engine, said open electrical generator producing direct current and comprising an alternator and a rectifier.

20. An internal combustion engine and an open electrical generator for use in conjunction with the internal combustion engine, said open electrical generator being located within the crankcase of the internal combustion engine, being exposed to the cooling, insulating and lubricating action of the lubricant contained in the internal combustion engine crankcase and being mechanically driven by the internal combustion engine at a speed at least three times the speed of the internal combustion engine, said open electrical generator producing direct current and comprising an alternator and a rectifier.

No references cited.